(12) United States Patent
Christiansen et al.

(10) Patent No.: US 10,929,350 B2
(45) Date of Patent: Feb. 23, 2021

(54) ENHANCED TECHNIQUES FOR COPYING CLOUD STORED FILES

(71) Applicant: Microsoft Technology Licensing, LLC, Redmond, WA (US)

(72) Inventors: Neal Robert Christiansen, Bellevue, WA (US); Ping Xie, Redmond, WA (US); Trevor Van Leeuwen, Redmond, WA (US); Jack Allen Nichols, Bothell, WA (US); Brian David Jones, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 15/831,341

(22) Filed: Dec. 4, 2017

(65) Prior Publication Data

US 2019/0171729 A1 Jun. 6, 2019

(51) Int. Cl.
*G06F 16/178* (2019.01)
*G06F 16/11* (2019.01)
*G06F 16/182* (2019.01)

(52) U.S. Cl.
CPC .......... *G06F 16/178* (2019.01); *G06F 16/122* (2019.01); *G06F 16/182* (2019.01); *G06F 16/184* (2019.01)

(58) Field of Classification Search
CPC .... G06F 16/178; G06F 16/182; G06F 16/184; G06F 16/122
See application file for complete search history.

(56) References Cited

U.S. PATENT DOCUMENTS

| | | | |
|---|---|---|---|
| 9,317,522 B2* | 4/2016 | Schoeffler | H04L 63/083 |
| 2015/0127770 A1* | 5/2015 | Dimmler | H04L 67/1097 709/217 |
| 2017/0228291 A1 | 8/2017 | Mokhtarzada et al. | |
| 2017/0308600 A1* | 10/2017 | Goldberg | G06F 16/27 |

FOREIGN PATENT DOCUMENTS

WO WO-2018147876 A1 * 8/2018 ............... G06F 7/00

OTHER PUBLICATIONS

Centos, How do I copy a symbolic link?, pp. Nov. 20, pp. 1-2. (Year: 2012).*
Ghoshal How to Move Files Between Cloud Storage Service Jul. 9, pp. 1-12 (Year: 2014).*

(Continued)

*Primary Examiner* — Albert M Phillips, III
(74) *Attorney, Agent, or Firm* — Newport IP, LLC; Mike R. Cicero

(57) ABSTRACT

A system to enable a user to generate copies of files at a client device and to cause a file hosting platform to generate backups of these copies in a cloud database without transferring file content data for these files between the client device and the cloud database. When a user copies a file from a first folder on a client device to a second folder on the client device, the system may determine that the file content data for this file is already present in the cloud database. Then, rather than uploading the file content data to the cloud database from the client device, the system may cause a file hosting platform to access the file content data directly from the cloud database to perform a file copy operation.

20 Claims, 5 Drawing Sheets

(56) References Cited

OTHER PUBLICATIONS

"International Search Report and Written Opinion Issued in PCT Application No. PCT/US2018/062364", dated Jan. 22, 2019, 18 Pages.

Google Developers: "CP—Copy Files and Objects", Retrieved from: https://download.huihoo.com/google/gdgdevkit/DVD1/developers.google.com/storage/docs/gsutil/commands/cp.html, Sep. 15, 2014, 10 Pages.

Linux: "xrdcp(1)—Linux man page," retrieved from htttps:/web.archive.org/web/20010126182936/https:/linux.die.net/man/1/srdcp, on Mar. 5, 2020, 4 pages.

* cited by examiner

ENHANCED TECHNIQUES FOR COPYING CLOUD STORED FILES

BACKGROUND

Some file hosting platforms are designed to automatically back-up files by synchronizing a cloud database with selected folders on a local drive on a client device. When a user adds new files to the selected folders at the client device, the new files are automatically uploaded to the cloud database from the client device. Some file hosting platforms allow for files to be stored at the client device solely as metadata until the user attempts to access the files. The metadata enables display of an icon for a particular file that shows the file type, file size, title, and any other suitable information for storing as metadata. When a user selects the particular file for opening, the file content data for the particular file is automatically downloaded to the client device.

Unfortunately, some existing file hosting platforms cannot dynamically adjust file copy operations to different data storage scenarios such as, for example, some systems cannot determine whether file content data of a particular file that is selected for copying is currently stored at the client device and/or the cloud database. For example, when a user begins the process of copying a particular file that is stored locally as metadata only, existing file hosting platforms must download the file content data from the cloud database to the client device, copy the particular file locally at the client device, and then upload the file content data back to the file hosting platform in association with the newly created file copy. Such shortcomings exacerbate computing resource scarcity issues including the overuse of network bandwidth as well as the finite nature of local storage space on client devices.

It is with respect to these and other considerations that the disclosure made herein is presented.

SUMMARY

Technologies described herein enable a system to determine data storage scenarios for files that have been selected for file copy operations and to adjust individual file copy operations based on individual data storage scenarios. Embodiments described herein enable a user at a client device to generate copies of files, whether the client device files contain complete file content data or are stored as metadata only, and to cause a file hosting platform to generate backups of these copies in a cloud database without transferring file content data between the client device and the cloud database. For example, in a scenario in which a user copies a file from a first folder on a client device to a second folder on the client device, the system may determine that the file content data for this file is already present in the cloud database. Then, rather than uploading the file content data to the cloud database from the client device, the system may cause a file hosting platform to access the file content data directly from the cloud database to perform a file copy operation. The disclosed technologies represent a substantial advantage over existing file hosting platforms which automatically and indiscriminately upload file content data from a client device for each file stored on the client device regardless of where file content data for such files is actually stored. Accordingly, the disclosed technologies substantially reduce network bandwidth usage associated with implementing file hosting platforms and managing cloud databases.

In an exemplary implementation, a system determines an electronic folder structure for providing access to files at a client device. The electronic folder structure may include a plurality of folders and subfolders. The electronic folder structure may further include one or more files that are stored within individual ones of the folders and/or subfolders. Based on the electronic folder structure, the client device may display a file-browser graphical user interface (GUI) that enables a user to browse through the folders and/or subfolders to locate individual files of interest. The file-browser GUI may further enable the user to select a particular file and to indicate a destination path within the organizational structure to copy the particular file. In a specific but non-limiting example, the electronic folder structure may include a top-level folder that is stored on a local drive of the client device and selected for synchronization to a cloud database (e.g., a ONEDRIVE, BOX, and/or DROPBOX root folder).

Using the file-browser GUI, the user may instruct the system to copy the particular file from a first folder in the electronic folder structure to a second folder in the electronic folder structure. Based on the user's instructions to copy the particular file, the system may generate a copy instruction that indicates a destination path to copy the particular file to (e.g., the second folder in the organizational structure) and also a source file ID blob corresponding to the particular file. In some implementations, the source file ID blob may have been previously provided by the file hosting platform to the client device and may serve as a source file locator to enable the file hosting platform to locate a source file when the file content data of the particular file is requested by the system.

The system may transmit the copy instruction to a synchronization engine that is operating at the client device and which then communicates aspects of the copy instruction to the file hosting platform. For example, the synchronization engine may provide the file hosting platform with the source file ID blob, the destination path, and/or an indication that the file content is to be copied from the source file (e.g., as identified by the source file ID blob) to the destination path.

Then, since the file content data for the particular file is stored in the cloud database, the file hosting platform may initiate a file copy operation to generate a copy of the particular file (referred to herein as "file copy") without the file content data being uploaded from the client device to the file hosting platform. The source file ID blob may be usable by the file hosting platform to locate a first instance of the file content data at a source path within the cloud database. Once the first instance is located, the file hosting platform may generate a second instance of the file content data at the destination path indicated in the copy instruction.

Based on the initiation of the file copy operation, the file hosting platform may generate a destination file ID blob that corresponds to the file copy (e.g., the second instance of the file content data) and may communicate the destination file ID blob back to the client device. Similar to how the source file ID blob is usable by the file hosting platform to locate the first instance of the file content data at the source path, the destination file ID blob is usable by the file hosting platform to locate the second instance of the file content data at the destination path. After receiving the destination file ID blob, the system may update the electronic folder structure at the local drive to include a placeholder that indicates the destination file ID blob. The placeholder may enable the system to provide access to the file copy at the client device once the file copy operation has been completed at the file hosting platform.

In some implementations, the system may determine a hydration status for the particular file that indicates whether or not the file content data is stored locally at the client device. For example, the system may determine that the particular file is a "dehydrated" file and, therefore, that the file content data is not stored on the local drive but is stored in the cloud database of the file hosting platform. As used herein, the term "dehydrated file" may refer to a data file that is stored on a local drive of a client device in a format that makes the data file visible to a user in a file-browser GUI while at least some content data of the data file is absent from the local drive. For example, a dehydrated file may be a relatively small file that is stored locally on a client device to represent a hydrated counterpart file that is stored in a cloud database. An exemplary dehydrated file may include a thumbnail image (e.g., a reduced-size visual representation of file content data) and metadata that identifies the name of the file and points to its hydrated counterpart in the cloud. As used herein, the term "hydrated file" may refer to a data file for which both metadata and file content data are stored on a local drive of a client device so that the data file can be opened locally without fetching the file content data from a cloud database.

In some implementations, the local drive may store metadata associated with both hydrated files and dehydrated files so that the file-browser GUI can display file icons to allow the user to perform various actions with respect to the hydrated files and the dehydrated files. For example, the file-browser GUI may enable the user to open, move, delete, drag-and-drop, and/or copy-and-paste the dehydrated files within a directory (e.g., an electronic folder) at the client device. When the user attempts to open a particular dehydrated file, the system may automatically fetch the file content data corresponding to the particular dehydrated file from the cloud database. Stated alternatively, a dehydrated file may remain "dehydrated" at the client device (e.g., to save local storage space) until a user request access to the dehydrated file (e.g., by double clicking a file icon to open the dehydrated file) at which time the dehydrated file may be automatically "hydrated" on demand by downloading its file content data. In this way, the dehydrated files don't take up substantial space on the client device because the file size of a dehydrated file may be limited to its corresponding metadata footprint.

In some implementations, the system may remotely initiate a file copy operation that is contained within a cloud data layer based on a determination that the particular file that is selected by the user for copying (i.e., a selected file) is a dehydrated file. In particular, the system may perform the file copy operation without transferring file content data between the client device and the file hosting platform in scenarios in which the file content data is absent from the client device and/or is available from the cloud database. For example, upon the user selecting the particular file, the system may determine that the individual file is "dehydrated" and may then dynamically adjust a corresponding copy instruction to include the source file ID blob that enables the file hosting platform to locate the first instance of the file content data at the source path.

In some implementations, the system may remotely initiate a file copy operation that is contained within the cloud data layer even in instances where the selected file is hydrated at the client device. For example, even when the selected file is hydrated at the client device such that the copy could be created in the cloud database by uploading the file content data from the client device, if the file is backed up in the cloud and synchronized then the system may know that instances of the file content data at the client device and the cloud database are identical. Thus, as described herein the system may duplicate the cloud instance of the file content data rather than uploading the local instance. It can be appreciated that such implementations may be beneficial for reducing network bandwidth usage over existing file hosting synchronization techniques.

In some implementations, the system may receive reporting data that indicates progress of the file copy operation. For example, the reporting data may indicate an amount of the first instance of the file content data that has been successfully copied from the source path into the second instance of the file content data at the destination path. Upon receiving the reporting data, the system may cause the client device to display a progress indicator GUI that graphically indicates the progress of the file copy operation (e.g., the progress indicator GUI may include a progress bar that fills up as the file copy operation progresses and/or a percentage indicator indicating a current percentage of the file content data that has been copied).

In some implementations, the system may cause the client device to display a GUI that enables the user to cancel the file copy operation before it is completed. For example, the user may manipulate the GUI to generate selection data that indicates a desire of the user to cancel to the copy operation. Based on the selection data, the system may generate a cancellation instruction that causes the placeholder to be removed from the electronic folder structure at the local drive and also causes the file hosting platform to terminate the file copy operation.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

Figure 1:
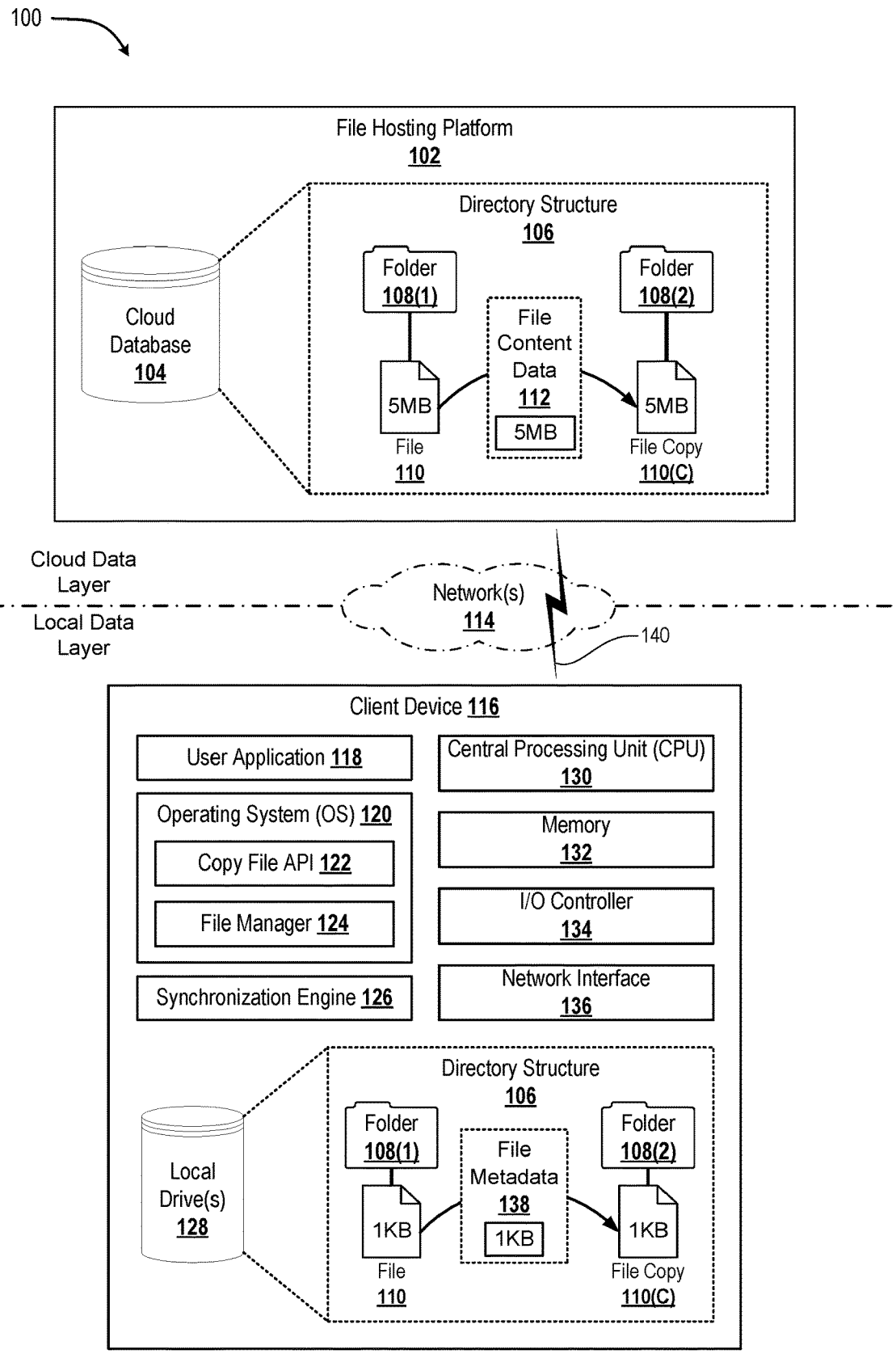
FIG. 1 illustrates an exemplary computing architecture for enabling a user to generate copies of files at a client device and to cause a file hosting platform to generate backups of these copies in a cloud database without transferring file content data for the files between the client device and the cloud database.

The following Detailed Description describes technologies that enable a system to determine data storage scenarios for files that have been selected for file copy operations and to adjust individual file copy operations based on individual data storage scenarios. An exemplary embodiment of the system described herein enables a user to generate copies of files at a client device and, based thereon, causes a file hosting platform to generate "hydrated" backups of these copies in a cloud database without transferring file content data between the client device and the cloud database. For example, the user may browse through one or more files that are included within an electronic folder structure using a file-browser graphical user interface (GUI) associated with a file manager of the client device. Using the file-browser GUI, the user may select an individual file within the electronic folder structure at the client device and indicate a destination path within the electronic folder structure to copy the individual file to. For example, the user may copy the individual file from a first directory (e.g., a folder within the electronic folder structure) on the client device to a second directory on the client device. The system may determine a data storage scenario associated with the individual file and, based thereon, may dynamically adjust a file copy operation for generating a "hydrated" backup of the individual file in a cloud database. For example, the system may determine that the file content data for the individual file is already present in the cloud database and, based thereon, adjust the file copy operation so that the file hosting platform accesses the file content data directly from the cloud database rather than receiving an upload of the file content data from the client device. As a more specific example, the system may cause the file hosting platform to access the file content data directly from the cloud database based on a determination that the individual file is a dehydrated file for which the file content data is not stored locally at the client device but is rather stored in the cloud database.

As described above, the term "dehydrated file" may refer to a data file that is stored on a local drive of a client device in a format that makes the data file visible to a user in a file-browser GUI while at least some content data of the data file is absent from the local drive. For example, a dehydrated file may be a relatively small file that is stored locally on a client device to represent a hydrated counterpart file that is stored in a cloud database. An exemplary dehydrated file may include a thumbnail image (e.g., a reduced-size visual representation of file content data) and metadata that identifies the name of the file and points to its hydrated counterpart in the cloud.

As described above, the term "hydrated file" may refer to a data file for which both metadata and file content data are stored on a local drive of a client device so that the data file can be opened locally without fetching the file content data from a cloud database.

The disclosed technologies represent a substantial advantage over existing file hosting platforms which automatically and indiscriminately upload file content data from a client device for each file placed in a directory structure (e.g., an electronic folder structure and/or any other scheme suitable for navigably arranging pluralities of data files) on the client device regardless of where file content data for such files is actually stored. In particular, as described above, existing file hosting platforms cannot dynamically adjust file copy operations to avoid uploading file content data from a client device when that file content data is already stored in a cloud database. These shortcomings of existing file hosting platforms exacerbate computing resource scarcity issues including the overuse of network bandwidth as well as the finite nature of local storage space on client devices. It can be appreciated, therefore, that the disclosed technologies represent a substantial advance toward reducing network bandwidth usage associated with implementing file hosting platforms and managing cloud databases.

Turning now to FIG. 1, illustrated is an exemplary system 100 for enabling a user to generate copies of files at a client device 116 and causing a file hosting platform 102 to generate backups of these copies in a cloud database 104 without transferring file content data 112 for the files between the client device 116 and the cloud database 104. For example, upon the user generating a file copy 110(C) of an individual file 110 at a local drive 128 (e.g., a SATA-type solid-state hard drive and/or any other suitable drive-type) of the client device 116, the system 100 may cause the file hosting platform 102 to locate file content data 112 for the individual file 110 within the cloud database 104. Accordingly, as illustrated, an instance of the file copy 110(C) that is stored at the cloud database 104 can be "hydrated" with the file content data 112 without the file hosting platform 102 receiving an upload of the file content data 112 from the client device 116 over one or more networks 114. Exemplary file hosting platforms 102 include, but are not limited to, DROPBOX, BOX, GOOGLE DRIVE, MEGA, PCLOUD, SUGARSYNC, AMAZON DRIVE, and/or MICROSOFT ONEDRIVE.

In some embodiments, the file hosting platform 102 may include a directory structure 106 for storing data associated with one or more files 110 within the cloud database 104. As used herein, the term "directory structure" may refer generally to any scheme with which a file system may cause files to be displayed to a user. An exemplary directory structure includes, but is not limited to, an electronic folder structure. In the specific embodiment of FIG. 1, the directory structure 106 may include one or more folders 108 at which one or more files 110 are stored. As used herein, the term "folder" may refer to a directory defined in a hierarchical file system cataloging structure and may include references to individual ones of the one or more files 110 and/or other directories. For example, as illustrated, the directory structure includes a first folder 108(1) that includes a reference to an individual file 110 and a second folder 108(2) to which the individual file 110 may be copied to generate a file copy 110(C) in accordance with the techniques described herein. In the illustrated example, the individual file 110 is hydrated within the first folder 108(1) within the directory structure 106 at the cloud database 104. As further illustrated, the local counterpart to the individual file 110 is dehydrated within the first folder 108(1) within the directory structure 106 at the local drive 128.

For purposes of adequately conveying the concepts and technical benefits described herein, it may be beneficial to prescribe a data size to the file content data 112 of the individual file 110 and file metadata 138 of the individual file 110. For purposes of the present discussion only, presume that the file content data 112 that specifically corresponds to the individual file 110 is five megabytes (5 MB) in size and furthermore that the individual file 110 has associated file metadata 138 that is one kilobyte (1 KB) in size. Thus, under these specific but nonlimiting presumptions, a dehydrated instance of the individual file 110 will consume a mere 1 KB of available storage space whereas a hydrated instance of the individual file will consume a considerable 5 MB. However, the specific sizes for the file content data 112 and/or the file metadata 138 may vary without departing from the scope of the present invention.

As used herein, the term "hydrated" may be used as a descriptive term to indicate that an instance of a file 110 at a particular storage location (e.g., the cloud database 104, the local drive 128, etc.) has its corresponding file content data 112 also stored at the particular storage location. For example, in the illustrated example, the instance of the individual file 110 that is stored in the cloud database 104 can aptly be described as a hydrated file since its 5 MB of corresponding file content data 112 is also stored within the cloud database 104.

As used herein, the term "dehydrated" may be used as a descriptive term to indicate that an instance of the file 110 at a particular storage location does not have its corresponding file content data 112 also stored at the particular location. For example, in the illustrated example, the instance of the individual file 110 that is stored in the local drive 128 can be aptly described as a dehydrated file since its 5 MB of corresponding file content data 112 is absent from the local drive 128. An exemplary dehydrated file may be a file that is stored on the local drive 128 solely as file metadata 138 so that the client device 116 can display a file-browser GUI that enables the user to perform certain actions at the client device 116 which do not require accessing file content data such as, for example, viewing properties of the dehydrated file, moving the dehydrated file within the directory structure 106, deleting the dehydrated file from the directory structure 106, or any other operations that may be performed without accessing file content data 112. When the user attempts to open a particular dehydrated file, the system 100 may automatically fetch corresponding file content data 112 from the cloud database 104. Stated alternatively, a dehydrated file may remain "dehydrated" at the client device 116 (e.g., to save local storage space) until a user requests access to the dehydrated file (e.g., by double clicking a file icon to open the dehydrated file) at which time the dehydrated file may be automatically "hydrated" on demand by downloading its file content data 112. In this way, the dehydrated files don't take up substantial space on the client device 116 because the file size of a dehydrated file may be limited to its corresponding metadata footprint.

In some examples, an individual file can be partially dehydrated at a particular storage location. For example, an individual file may be stored at the local drive 128 as the metadata 138 and some but not all of its corresponding file content data. As a more specific example, a 5 MB file may be stored locally as metadata 138 (e.g., to make file properties viewable) and a most commonly accessed 2 MB portion of the 5 MB. For purposes of the present discussion, describing an instance of a file at any particular storage location as "hydrated" is not to be construed as an indication that another instance of that file (or other files for that matter) is, or even could be, "dehydrated" at that particular storage location. For example, in some implementations, the file hosting platform 102 is configured to store all file instances along with their corresponding file content data 112 such that all file instances stored within the cloud database 104 may be aptly referred to as "hydrated." Stated alternatively, in some implementations, none of the file instances stored within the cloud database 104 are "dehydrated."

In some embodiments, the client device 116 may include a user application 118 that provides access to the one or more files 110 in accordance with the directory structure 106. For example, the user application 118 may cause the client device 116 to display a file-browser graphical user interface (GUI) that enables a user to navigate through the directory structure 106. As a more specific but nonlimiting example, the user application 118 may cause the client device to display graphical folder representations for individual ones of the folders 108 and may further display file icons within the graphical folder representations to enable the user to open, move, delete, or copy files contained within the folders 108. In some embodiments, the user application 118 may communicate with one or more components of an operating system (OS) 120 for the purpose of displaying the file-browser GUI and/or for facilitating the generation of selection data that indicates an individual file 110 and a destination path within the directory structure 106 to copy the individual file 110 to. The OS 120 may be any suitable system software for managing computer hardware and/or software resources and for providing services to the user application 118 and/or other applications (not shown). An exemplary OS 120 may include, but is not limited to, various versions of MICROSOFT WINDOWS (e.g., WINDOWS 8.1 or 10, WINDOWS EMBEDDED STANDARD 7, etc.) and/or various versions of macOS (e.g., macOS SIERRA, macOS X, etc.).

In some examples, the user application 118 may communicate with a file manager 124 of the OS 120. Exemplary file managers include, but are not limited to, the FILE EXPLORER component of MICROSOFT WINDOWS and/or the FINDER component of the family of MACINTOSH operating systems developed by APPLE, INC. In some examples, the user application 118 may communicate with a copy file application programming interface (API) 122 of the OS 120. The copy file API 122 may be an abstraction of a data reading functionality that causes the client device 116 to read data from a specified file and a data writing functionality that causes the client device 116 to write data to a specified destination path. Exemplary user applications 118 include, but are not limited to, desktop client applications that are specifically configured to communicate with the file hosting platform 102 (e.g., the DROPBOX APP desktop application developed by DROPBOX, the BOX DRIVE desktop application developed by BOX, and/or, the ONE-DRIVE desktop client that is native to WINDOWS 10). Accordingly, it can be appreciated that in various implementations the user application 118 may be configured to maintain a local instance of the directory structure 106 and to enable the user to browse through the local instance of the directory structure 106 without continuously communicating with the file hosting platform 102.

In some implementations, the client device 116 may include a synchronization engine 126 for synchronizing the local instance of the directory structure 106 that resides at the client device 116 with a cloud instance of the directory structure 106 that resides on the cloud database 104. Exemplary synchronization engines 126 include, but are not limited to, SYNC API developed by DROPBOX, BACKUP AND SYNC developed by GOOGLE, and the ONEDRIVE UNIVERSAL WINDOWS PLATFORM (UWP) APP for MICROSOFT'S WINDOWS 10. Accordingly, it can be appreciated that the synchronization engine 126 may be a native component of the OS 120 or may be an add-on component that is downloaded and installed onto the client device 116 separate from the OS 120.

In various implementations, the synchronization engine 126 is configured to provide access to at least some files 110 stored in the cloud database 104 without downloading the file content data 112 corresponding to these files to the local drive 128. For example, the synchronization engine 126 may maintain a local directory structure (e.g., an instance of the directory structure 106 that resides on the client device 116) that includes a set of dehydrated files associated with first content data that is absent from the local drive 128. In such an example, a cloud directory structure (e.g., an instance of the directory structure 106 that resides on the file hosting platform 102) may include hydrated counterparts for individual dehydrated files of the set of dehydrated files. Accordingly, a user may be able to see icons and/or other data associated with dehydrated files in the file-browser GUI just like any other file stored on the client device 116. In some implementations, when a user instructs the OS 120 to open a particular dehydrated file, the synchronization engine 126 automatically downloads the file content data 120 that corresponds to the particular dehydrated file. For example, upon a user instructing the OS 120 to open the "dehydrated" instance of the individual file 110 stored on the local drive 128, the synchronization engine 126 may automatically begin communicating with the file hosting platform 102 to download the 5 MB of file content data 112 that corresponds to the individual file 110.

As further illustrated, the client device 116 includes a central processing unit ("CPU") 130 that is connected, via a bus (not shown), to various components such as the local drive 128, a memory 132, an input/output (I/O) controller 134, and/or a network interface 136. It can be appreciated that the system components described herein (e.g., the user application 118, the OS 120, and/or the synchronization engine 126) may, when loaded into the CPU 130 and executed, transform the CPU 130 and the overall client device 116 from a general-purpose computing system into a special-purpose computing system customized to facilitate the functionality presented herein. The CPU 130 may be constructed from any number of transistors or other discrete circuit elements, which may individually or collectively assume any number of states. More specifically, the CPU 130 may operate as a finite-state machine, in response to executable instructions contained within the software modules disclosed herein. These computer-executable instructions may transform the CPU 130 by specifying how the CPU 130 transitions between states, thereby transforming the transistors or other discrete hardware elements constituting the CPU 130.

The local drive 128 and associated computer-readable media provide non-volatile storage for the client device 116. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the client device 116. For purposes of the claims, the phrase "computer storage medium," "computer-readable storage medium," and variations thereof, does not include waves, signals, and/or other transitory and/or intangible communication media, per se.

The I/O controller 134 may receive and process input from a number of other devices, including a keyboard, mouse, or electronic stylus (not shown in FIG. 1). Similarly, the I/O controller 134 may provide output to a display screen (e.g., to display the file-browser GUI described herein), a printer, or other type of output device (also not shown in FIG. 1). The network interface 136 may enable the client device 116 to connect to one or more network(s) 114 such as a local area network (LAN), a wide area network (WAN), a wireless local area network (WLAN), or any other suitable network for passing information between the client device 116 and the file hosting platform 102.

With respect to the process flow scenario of FIG. 1, in the illustrated example the process is initiated by a user of the client device 116 performing a local file copy operation on the client device 116 for copying the dehydrated instance of the individual file 110. For illustrative purposes, the dehydrated instances of the individual file 110 and the file copy 110(C)) are marked in FIG. 1 as "1 KB" to indicate that these instances are stored on the local drive 128 as metadata only (e.g., without the file content data 112). In the local copy operation, the user has selected the individual file 110 from the first folder 108(1) and has indicated the second folder 108(2) as being a destination path to copy a file 110 to. Accordingly, as illustrated, the client device 116 reads the file metadata 138 for the individual file 110 from within the first folder 108(1) and writes the file metadata 138 to the second folder 108(2) to generate a file copy 110(C) at the client device 116.

Based on the user having initiated the local copy operation, the client device 116 may communicate with the file hosting platform 102 via a communication link 140 that is facilitated by the network(s) 114 to remotely initiate a cloud file copy operation that corresponds to the local file copy operation. For example, the client device 116 may indicate a source file ID blob corresponding to the individual file 110 to enable the file hosting platform 102 to identify a hydrated counterpart of the individual file 110 and, ultimately, to read file content data 112 of the hydrated counterpart to generate a hydrated instance of the file copy 110(C) within the cloud data layer. For illustrative purposes, the hydrated instances of the individual file 110 and the file copy 110(C)) are marked in FIG. 1 as "5 MB" to indicate that these instances are stored in the cloud database 104 with at least the file content data 112 (and in some implementations the metadata 138 as well). Accordingly, it can be appreciated that the system 100 enables the user to generate copies of files at the client device 116 and, based thereon, causes the file hosting platform 102 to generate backups of these copies in the cloud database 104 without transferring the file content data 112 from the local data layer over the networks into the cloud data layer. Stated alternatively, the client device 116 is configured to remotely initiate cloud file copy operations that are contained within the cloud data layer (e.g., in the sense that file content data is not transferred between the local data layer and the cloud data layer) based on the user initiating local copy operations that occur at the client device 116.

Figure 2:
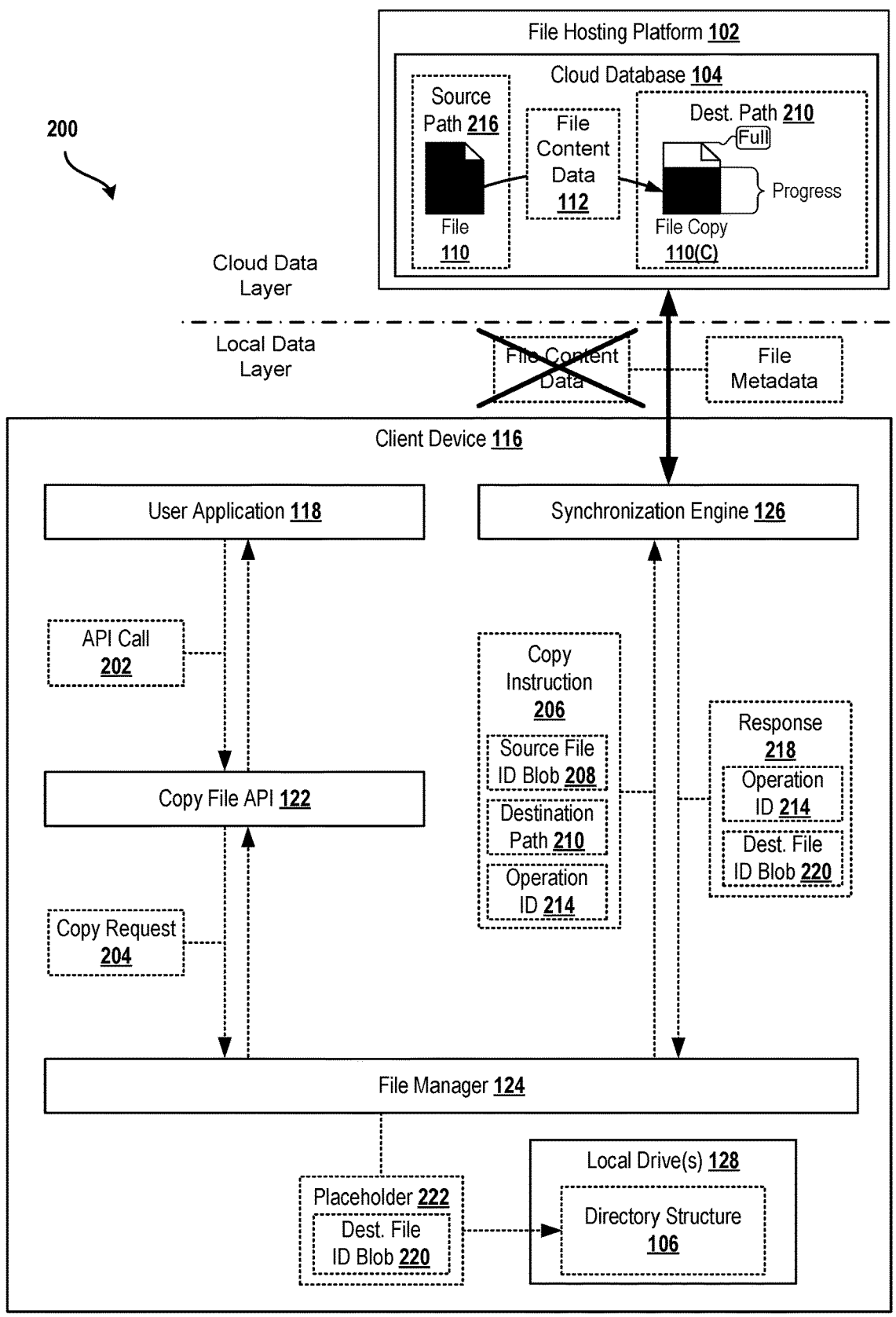
FIG. 2 illustrates an exemplary dataflow scenario in which a file hosting platform is caused to hydrate an instance of a file copy in a cloud database without a corresponding instance of the file copy at a client device being hydrated with file content data.

Turning now to FIG. 2, an exemplary dataflow scenario 200 is illustrated in which the file hosting platform 102 is caused to hydrate an instance of a file copy 110(C) in the cloud database 104 without a corresponding instance of the file copy 110(C) at the client device 116 being hydrated with file content data 112. As illustrated, the user application 118 generates an API call 202 to deploy functionality of the copy file API 122. In some examples, the user application 118 that generates the API call 202 may be a desktop client application that is configured to communicate with the file hosting platform 102 to enable the user to access and/or manage (at the client device 116) files that are stored in the cloud database 104. For example, the user application 118 may locally populate one or more folders with local instances of the files that are stored in the cloud database. In some examples, the user application 118 may further be configured to automatically backup files that a user places into the directory structure 106 at the client device 116. For example, the user application 118 may automatically upload new file content that is added to one or more folders on the local drive 128.

In an exemplary embodiment, the API call 202 may be generated by the user application 118 in response to selection data that is generated based on a user interaction with a file-browser GUI. Exemplary user interactions include, but are not limited to, a user dragging the individual file 110 from the first folder 108(1) to the second folder 108(2) in a manner that instructs the user application 118 to generate a new instance of the individual file (i.e., the file copy 110(C)) at the second folder 108(2), a user selecting the individual file 110 within the first folder 108(1) and performing a keystroke associated with a copy instruction (e.g., CTRL+C) and then selecting the second folder 108(2) and performing a keystroke associated with a paste instruction (CTRL+V), or any other user interaction suitable to instruct the user application 118 to copy the individual file 100 to a specified location.

In response to the API call 202, the copy file API 122 may communicate a copy request 204 to the file manager 124. In some examples, the file manager 124 may include a native filter manager for managing and/or implementing various filter drivers such as, for example, a cloud filter driver that is configured to communicate with the synchronization engine 126. In the illustrated data flow scenario 200, the file manager 124 both updates the local drive 128 based on the copy request 204 and also communicates with the synchronization engine 126 to cause the file hosting platform 102 to make corresponding updates to the cloud database 104. More specifically, the file manager 124 transmits a copy instruction 206 to the synchronization engine 126 wherein the copy instruction 206 includes various parameters associated with the copy request 204. In the illustrated example, the copy instruction 206 includes a source file ID blob 208 that is usable by the file hosting platform 102 to locate a source file that includes the file content data 112 for the individual file 110 that the user has selected for copying. For example, the source file ID blob 208 may enable the file hosting platform 102 to identify a source path 216 of the hydrated instance of the individual file 110 at the cloud database 104. In various implementations, the source file ID blob 208 may have been previously provided to the client device 116 by the file hosting platform 102 when the hydrated instance of the individual file 110 was created within the cloud database 104. As further illustrated, the copy instruction 206 includes a destination path 210 to identify a particular location to which the individual file 110 is to be copied. For example, the destination path 210 may indicate that the individual file 110 is to be copied to the second folder 108(2) within the directory structure 106.

Upon receiving the copy instruction 206, the synchronization engine 126 may communicate at least some aspects of the copy instruction 206 to the file hosting platform 102 to trigger a copy operation that occurs within the cloud data layer. For example, as illustrated, the synchronization engine 126 and the file hosting platform 102 may communicate file metadata associated with the individual file 110 (e.g., the source file ID blob 208) and/or the file copy 110(C) (e.g., the destination path 210 and/or a destination file ID blob 220). The communications received from the synchronization engine 126 may trigger the file hosting platform 102 to initiate a file copy operation that is contained within the cloud data layer. For example, as illustrated, the communication triggers the file hosting platform 102 to read the file content data 112 from the source path 216 and also to write the file content data 112 to the destination path 210 to generate the file copy 110(C) in the cloud database 104.

In some implementations, the synchronization engine 126 may communicate a response 218 back to the file manager 124 to inform the file manager 124 whether a file copy operation has been successfully initiated at the file hosting platform 102 and/or whether the file hosting platform 102 has been able to locate a source file (e.g., a file that includes the file content data 112) using the source file ID blob 208. In various examples, the response 218 may include a destination file ID blob 220 that is usable by the file hosting platform 102 to locate the newly generated hydrated instance of the file copy 110(C). In some implementations, the destination file ID blob 220 may be provided to the synchronization engine 126 by the file hosting platform 102 as a unique identifier for the hydrated instance of the file copy 110(C) that is being generated in the cloud database 104. Thus, the destination file ID blob 220 can be subsequently provided back to the file hosting platform 102 in a request for file content data and, by virtue of the destination file ID blob 220 being included within the request, the file hosting platform 102 will know which file content is being requested.

As further illustrated, the file manager 124 may store in the local drive 128 the destination file ID blob 220 along with a placeholder 222 associated with the file copy 110(C). As described above, the placeholder 222 may enable the system 100 to provide access to the file copy 110(C) at the client device 116 once the file copy operation has been completed at the file hosting platform 102. For example, the placeholder 222 may cause the client device 116 to display a graphical icon representation of the file copy 110(C) within a file-browser GUI even though the file content data 112 is absent from the local drive 128. Then, if the user goes to open the file copy 110(C) (e.g., by performing a double click on the graphical icon), the client device 116 may automatically download the file content data 112 from the file hosting platform 102 by sending a request for file content data to the file hosting platform 102 and including the destination file ID blob 220 with the request.

In some implementations, the copy instruction 206 may include an operation identifier (ID) 214 to enable the synchronization engine 126 and the file manager 124 to asynchronously communicate about a particular copy request 204. For example, the file manager 124 may provide the operation ID 214 to the synchronization engine 126 which may then return the operation ID 214 within the response 218 to indicate that the response 218 corresponds to the copy instruction 206 and not some other copy instruction (not shown). It can be appreciated, therefore, that by including the operation ID 214 within the response along with the destination file ID blob 220, the file manager 124 is able to attach the destination file ID blob 220 onto the correct placeholder 222.

Figure 3:
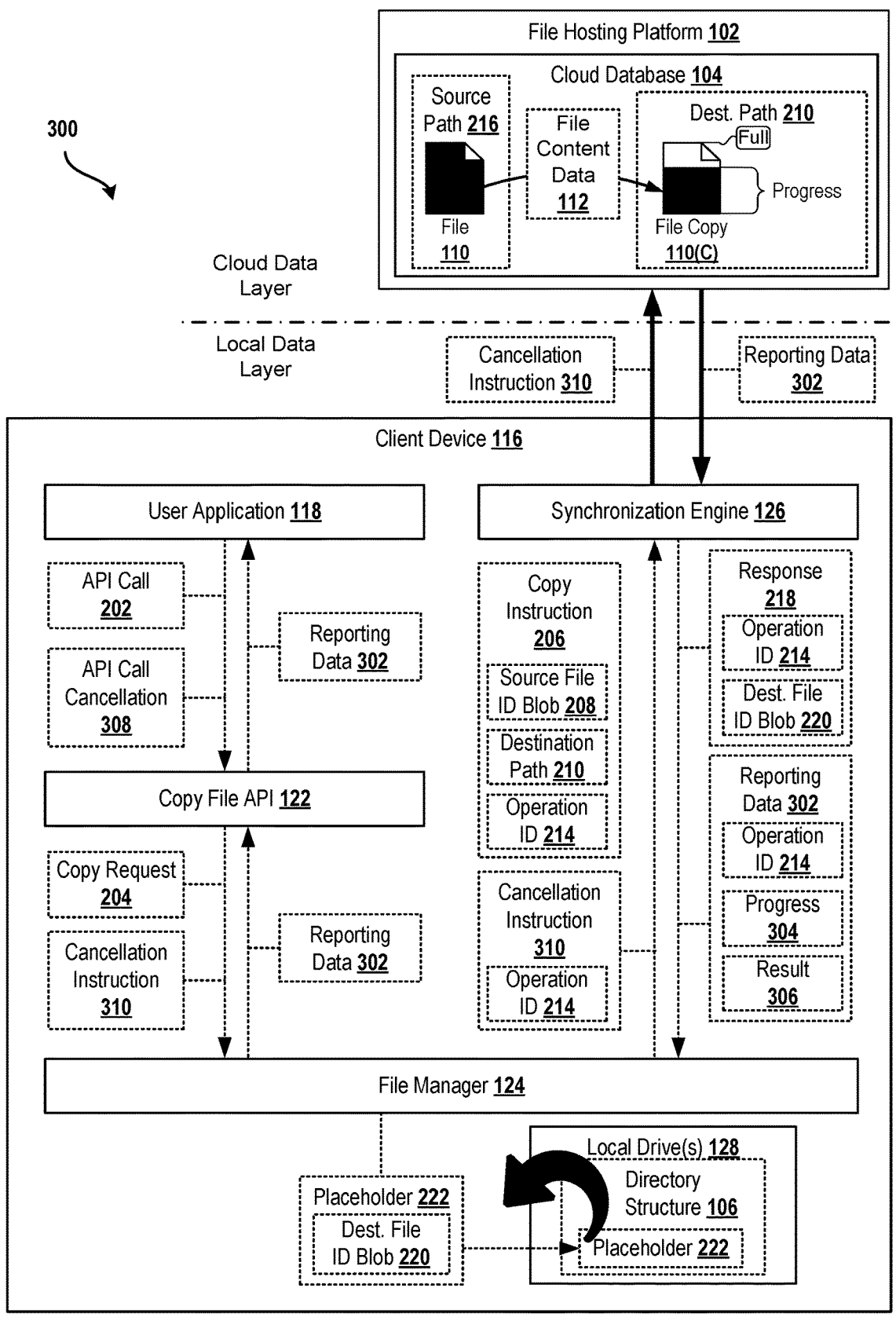
FIG. 3 illustrates an exemplary dataflow scenario in which a file hosting platform provides reporting data to a client device to indicate progress of a file copy operation and/or a result of the file copy operation.

Turning now to FIG. 3, an exemplary dataflow scenario 300 is illustrated in which the file hosting platform 102 provides reporting data 302 to the client device 116 to indicate progress 304 of a file copy operation and/or a result 306 of the file copy operation. The data flow scenario 300 builds upon aspects of the data flow scenario 200. Accordingly, details described with relation to the data flow scenario 200 (e.g., API call 202, copy instruction 206, response 218, etc.) are similarly applicable to data flow scenario 300 and are not redundantly described with relation to FIG. 3.

In some examples, the progress 304 may indicate an amount of the file content data 112 that has been read from the source path 216 and written into the destination path 210 to generate the file copy 110(C). The progress 304 may be expressed in terms of a ratio of the file content data 112 that has been copied versus the total amount of the file content data 112 and/or a percentage of the file content data that has been copied. In the illustrated example, the file hosting platform 102 provides the reporting data 302 directly to the synchronization engine 126 which in turn affixes the operation ID 214 to the reporting data 302 before passing the reporting data 302 along to the file manager 124. As further illustrated, the file manager 124 may relay the reporting data 302 through the copy file API 122 to the user application 118 which may cause the client device 116 to graphically display aspects of the progress 304. For example, the file-browser GUI may be caused to display a progress bar that progressively fills up as the file copy operation becomes closer to completion. In various implementations, the synchronization engine 126 may poll the file hosting platform 102 for the reporting data 302. For example, the synchronization engine 126 may send periodic progress inquiries to the file hosting platform 102.

In some examples, the result 306 may indicate whether the file copy operation has been successfully completed at the file hosting platform 102. For example, the file hosting platform 102 may provide the result 306 to the client device 116 to indicate that the file copy operation has been completed. Under these circumstances, the result 306 may be relayed from the synchronization engine 126 through the file manager 124 and ultimately to the user application 118. In some examples, the application 118 may inform the user that the file copy operation has been completed (e.g., both at the local drive 128 and at the cloud database 104). As another example, the file hosting platform 102 may provide the result 306 to the client device 116 to indicate that the hydrated instance of the individual file 110 that exists at the source path 216 has been corrupted or is otherwise unavailable and, therefore, that the file copy operation cannot be completed within the cloud data layer. In some examples, under these circumstances, the synchronization engine 126 may determine a hydration status for the local instance of the individual file that is stored on the local drive 128. Then, if the individual file 110 is hydrated on the local drive 128, the copy operation may be performed by uploading the file content data 112 to the file hosting platform 102 from the client device 116. Alternatively, if the individual file is dehydrated on the local drive 128, then the user may be informed that the copy operation cannot be completed.

In some implementations, the user application 118 may enable the user to cancel a file copy operation that is in progress. For example, as illustrated, the user application 118 generates an API call cancellation 308 to cancel the deployed functionality of the copy file API 122. In response to the API call cancellation 308, the copy file API 122 may communicate a cancellation instruction 310 to the file manager 124. Upon receipt of the cancellation instruction 310, the file manager 124 may relay the cancellation instruction 310 along with the operation ID 214 to the synchronization engine 126 which in turn relays aspects of the cancellation instruction 310 to the file hosting platform 102. The file hosting platform 102 then cancels the file copy operation that is occurring within the cloud database 104. The file manager 124 may further respond to the cancellation instruction 310 by removing the placeholder 222 from the directory structure as indicated by the "undo" icon overlaid on the placeholder 222 within the local drive 128.

Figure 4:
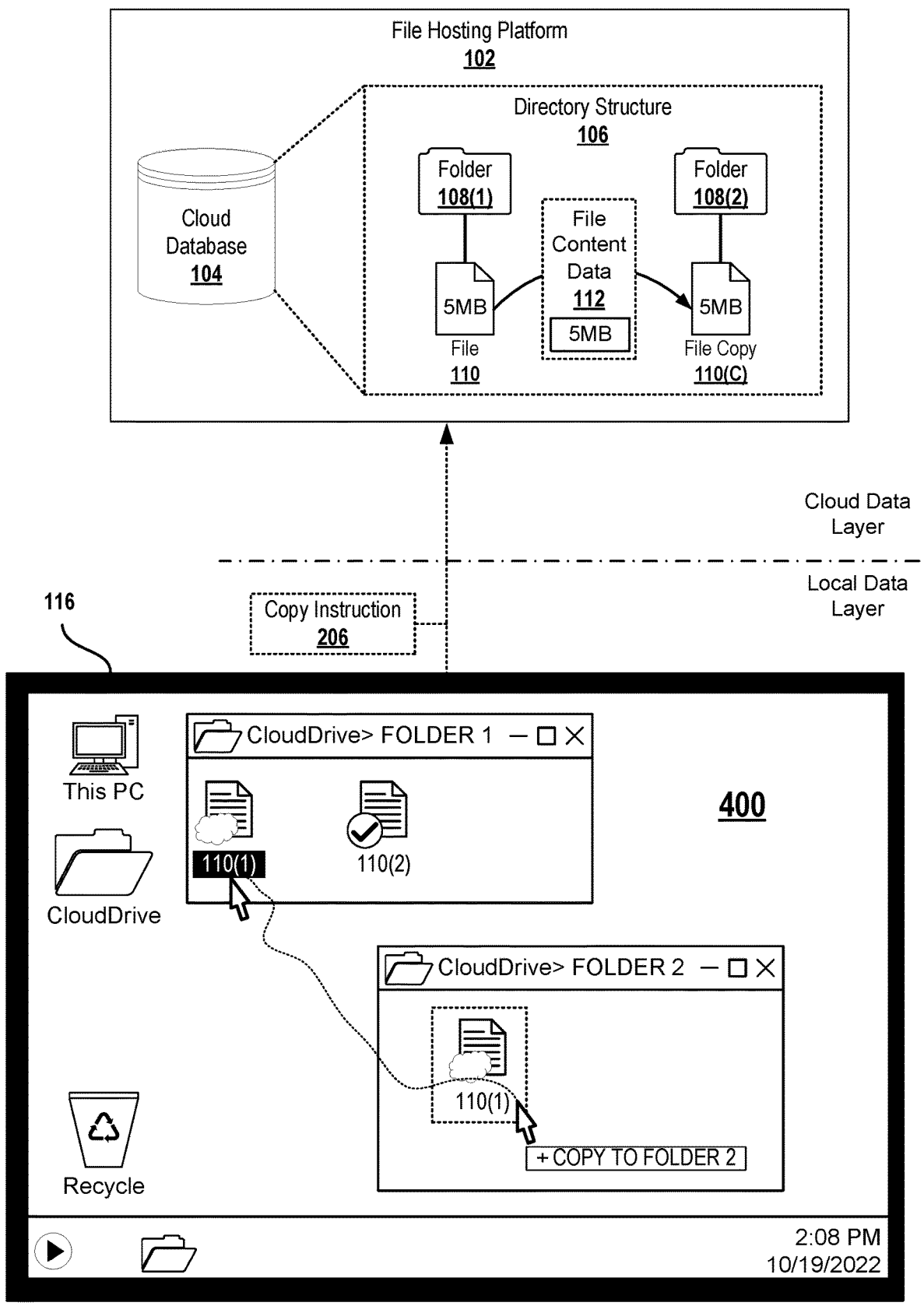
FIG. 4 illustrates an exemplary file-browser GUI that enables a user to perform a local copy operation that generates a dehydrated file copy in a manner so as to trigger a file hosting platform to generate a cloud copy operation that generates a hydrated counterpart to the dehydrated file copy.

Turning now to FIG. 4, an exemplary file-browser GUI 400 is shown that can be displayed at the client device 116 in association with the user application 118 to enable a user to copy files within the directory structure 106. In the illustrated example, a user is performing a drag-and-drop gesture to copy a first individual file 110(1) from a first folder 108(1) to a second folder 108(2). Based on the drag-and-drop gesture, the user application 118 generates selection data that indicates the first individual file 110(1) as well as a destination path within the directory structure 106 to copy the first individual file 110(1) to. As further illustrated, the client device 116 may generate the copy instruction 206 based on the selection data and, ultimately, may transmit at least some aspects of the copy instruction 206 to the file hosting platform 102 in accordance with the techniques described herein.

In some embodiments, the file-browser GUI 400 may be configured to graphically indicate a hydration status for individual files 110. In the illustrated example, the file-browser GUI 400 is graphically representing two files within the first folder 108(1) along with an indication of a hydration status for each of these two files. More specifically, the first individual file 110(1) is represented with a cloud icon superimposed over its corresponding file icon to indicate that this file is dehydrated at the client device 116. Thus, a user can tell from the cloud icon that the file content data 112 for the first individual file 110(1) is absent from the local drive 128 of the client device 116. Moreover, a second individual file 110(2) is represented with a checkmark icon indicating that this file is hydrated at the client device 116. Thus, a user can tell from the checkmark icon that the file content data 112 corresponding to this file is currently stored on the client device 116 such that this file can be opened locally without having to fetch the file content data from the file hosting platform 102. In various implementations, a user may be able to designate which files to hydrate locally and/or which files to store locally in a dehydrated state.

Figure 5:
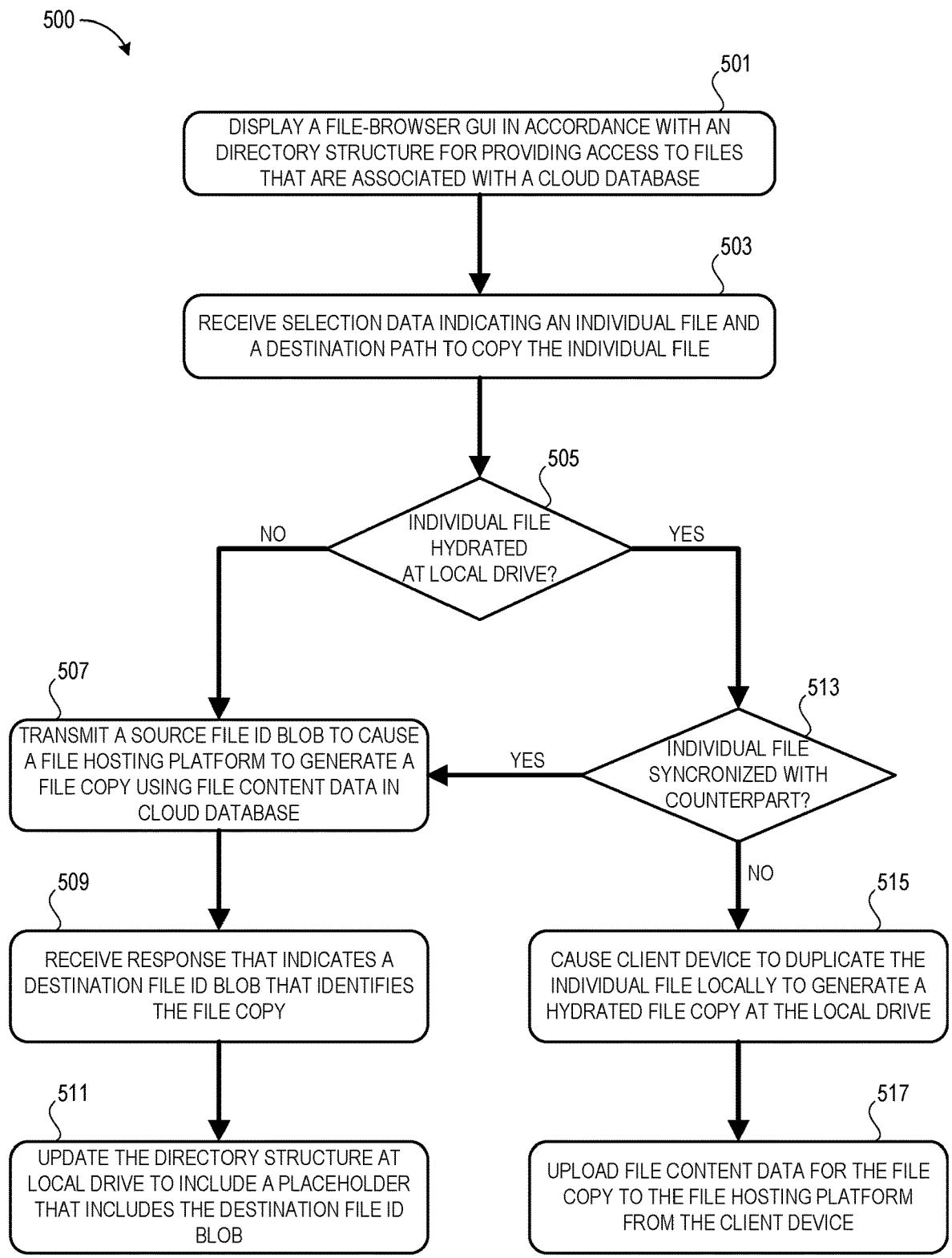
FIG. 5 is a flow diagram of an example method for dynamically adjusting a file copy operation for generating a file copy within a cloud database based upon a data storage scenario of an individual file selected for the file copy operation.

FIG. 5 is a flow diagram of an example method 500 for dynamically adjusting a file copy operation for generating a file copy within a cloud database based upon a data storage scenario of an individual file selected for the file copy operation. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 501, a system (e.g., the client device 116) displays a file-browser GUI in accordance with a directory structure 106. The file-browser GUI may provide a user with access to a plurality of files that are associated with a cloud database. For example, with particular reference to FIG. 4, the file-browser GUI 400 is displayed in accordance with the directory structure 106 shown in relation to the cloud database 104.

At block 503, the system receives selection data that indicates an individual file and a destination path within the directory structure 106 to copy the individual file to. For example, again referencing FIG. 4, a user may perform a drag-and-drop gesture that causes the user application 118 to generate selection data indicating that the individual file is to be copied to a particular folder. Although the techniques of the present application are described with reference to copying a file from a first folder to a second folder, it is within the scope of the present invention for the file copy to be generated in the same folder that houses the original file.

At decision block 505, the system determines a hydration status for the individual file at the local drive 128. More specifically, the system determines whether the individual file that has been selected for copying by the user is stored at the local drive 128 as a hydrated file (e.g., with its corresponding file content data 112) or as a dehydrated file (e.g., at least some of the file content data 112 for the individual file is absent from the local drive. It can be appreciated that in some instances a file may be partially dehydrated such that some, but not all, of the file's corresponding file content data 112 is absent from the local drive 128. As a more specific but nonlimiting example, a particular file that includes five ("5") MB of file content data 112 may be partially dehydrated on the local drive 128 such that only two ("2") MB of the five ("5") MB of file content data 112 is stored at the local drive 128. It can further be appreciated that in various implementations, file metadata 138 may be stored locally at the client device 116 for any particular file regardless of that particular file's hydration status. Stated alternatively, file metadata 138 may be stored at the local drive 128 for hydrated files and/or dehydrated files.

If the individual file is at least partially dehydrated, then the process 500 progresses from block 505 to block 507 at which the system transmits a source file ID blob that causes a file hosting platform 102 to generate a file copy 110(C) within a cloud database using file content data 112 that is also stored within the cloud database. As described elsewhere herein, in some implementations the file hosting platform 102 may also be provided with an indication as to a destination path 210 at which the file copy 110(C) is to be generated.

From block 507, the process 500 progresses to block 509 at which the system receives a response that indicates a destination file ID blob that is usable by the file hosting platform 102 to locate the file copy 110(C) that is generated (or is being generated) at the destination path 210 within the cloud database. For example, once the file copy 110(C) has been generated at the cloud database 104 and the client device 116 has been provided with the destination file ID blob 220, the underlying file content data for the file copy 110(C) can be requested using the destination file ID blob 220 (e.g., a request sent from the client device 116 to the file hosting platform 102 can include the destination file ID blob 220 to inform the file hosting platform 102 which specific data is being requested).

From block 509, the process 500 progresses to block 511 at which the system updates the directory structure 106 at the local drive 128 to include a placeholder 222 that includes the destination file ID blob. As described above, the placeholder 222 may enable the system to provide access to the file copy 110(C) at the client device 116 once the file copy operation has been completed at the file hosting platform 102. In particular, the placeholder 222 may cause the file-browser GUI to show an icon associated with the file copy 110(C) despite the corresponding file content data being absent from the local drive 128. Then, upon a user double clicking the icon to access the file content data for the file copy 110(C), the system may automatically request the file content data from the file hosting platform by providing the destination file ID blob 220 to the file hosting platform 102.

If the individual file is hydrated, then the process 500 progresses from block 505 to decision block 513 at which the system determines whether the individual file that has been selected for copying is currently synchronized with a counterpart file that exists within the cloud database 104. Stated alternatively, the system determines whether the version of the individual file that exists on the local drive 128 that the user has selected for copying identically matches the version of the individual file that exists on the cloud database 104. Under circumstances in which the local and cloud versions of the file are identical (e.g., the individual file is synchronized with its counterpart on the cloud database), the file copy can be created in the cloud database without transferring file content data 112 between the client device 116 and the file hosting platform 102. In contrast, under circumstances in which changes have been made to the local version of the file which have not yet been saved to the cloud (e.g., the individual file is not synchronized with its counterpart on the cloud database), the file hosting platform 102 may be unable to accurately create the file copy in the cloud database since its version of the individual file is out of sync with what the user has selected to copy.

If the individual file is currently synchronized with its counterpart file on the cloud database, then the process 500 progresses from block 513 to block 507 so that a hydrated instance of the file copy 110(C) is generated in the cloud database 104 without the file content data 112 being uploaded to and/or downloaded from the file hosting platform 102. For example, since the individual file's synchronization status confirms that the cloud instance of the individual file is an identical match to the local instance that the user selected for copying, the system may accurately duplicate the file content data 112 without receiving a file content upload from the client device 116. Thus, it can be appreciated that the technical benefits of the techniques described herein (e.g., reduced network bandwidth usage) are not limited to circumstances where a user is copying dehydrated files. In the specific implementation described with reference to FIG. 5, the system progresses from block 507 through block 511 to generate a placeholder and associate the placeholder with the destination file ID blob as described above. In other implementations, the system may generate a hydrated file locally at the client device and then associate the destination file ID blob received from the file hosting service 102 with the local hydrated file copy so that hydrated copies are created both locally and in the cloud without file content data being transferred between the client device 116 and the file hosting platform.

If the individual file is not currently synchronized with its counterpart file, then the process 500 progresses from block 513 to block 515 at which the system causes the client device to duplicate the individual file locally at the local drive to generate a hydrated file copy of the individual file 110. Exemplary circumstances which cause the process 500 to progress to block 515 include, but are not limited to, a user modifying the individual data file at the client device while the client device is not connected to the internet. Due to the lack of internet connectivity, the client device may be temporarily unable to synchronize the user's changes to the counterpart on the cloud database. Thus, the system may duplicate the file locally rather than duplicating the out of sync counterpart that resides in the cloud database. Once the hydrated file copy of the individual file 110 has been generated locally at the local drive 128, the synchronization engine 126 recognizes the existence of a new file that has yet to be uploaded to the cloud database 104. Thus, the process 500 progresses from block 515 to block 517 at which the system uploads file content data for the hydrated file copy to the file hosting platform 102 from the client device 116.

Although the method 500 has been described in a manner such that the file copy operation is dynamically adjusted based at least in part on a synchronization status of the file selected for copying, other implementations omit dependencies on any such synchronization status. For example, in some implementations, a method may proceed from block 505 directly to block 515 such that when an individual file that is selected for copying is determined to be hydrated at the local drive the system automatically generates a local hydrated file copy which in turn causes the synchronization engine to upload corresponding file content data to the file hosting platform 102.

EXAMPLE CLAUSES

The disclosure presented herein may be considered in view of the following clauses.

Example Clause A, a client device for remotely initiating file copy operations that are contained within a cloud data layer, the client device comprising: a local drive; one or more processors; a memory in communication with the one or more processors, the memory having computer-readable instructions stored thereupon which, when executed by the one or more processors, cause the client device to: determine an electronic folder structure for providing access to one or more files at the client device; display a file-browser graphical user interface (GUI) showing the one or more files arranged within the electronic folder structure, wherein the file-browser GUI enables a user to generate selection data indicating an individual file, of the one or more files, and a destination path within the electronic folder structure to copy the individual file to; generate, based on the selection data, a copy instruction that indicates at least the destination path and a source file ID blob corresponding to the individual file; transmit the copy instruction to a synchronization engine to cause the synchronization engine to communicate at least some aspects of the copy instruction to a file hosting platform storing content data of the individual file, and wherein the at least some aspects cause the file hosting platform to initiate a file copy operation to generate a file copy by copying a first instance of the content data from a source path in a cloud database to generate a second instance of the content data at the destination path in the cloud database; receive a response that indicates at least a destination file ID blob corresponding to the file copy at the destination path; and update, at the local drive, the electronic folder structure to include a placeholder for providing access to the file copy at the client device, wherein the placeholder indicates at least the destination file ID blob.

Example Clause B, the client device of Example Clause A, wherein the computer-readable instructions further cause the client device to: determine a hydration status, of the individual file, that indicates whether the content data of the individual file is stored in the local drive; and determine the at least some aspects of the copy instruction based at least in part on the hydration status.

Example Clause C, the client device of Example Clause B, wherein the computer-readable instructions further cause the client device to include the source file ID blob within the copy instruction based at least in part on the hydration status indicating that the individual file is a dehydrated file such that the content data is absent from the local drive.

Example Clause D, the client device of any of Example Clauses A through C, wherein the file-browser GUI is generated in accordance with a user application that enables the user to copy dehydrated files, that are stored within the electronic folder structure at the local drive, to remotely initiate the file copy operations for copying hydrated files, that correspond to the dehydrated files, within the electronic folder structure at the cloud database.

Example Clause E, the client device of any of Example Clauses A through D, wherein the computer-readable instructions further cause the client device to: receive reporting data that indicates at least progress of the file copy operation associated with an amount of the first instance of the content data that has been copied from the source path in the cloud database to the second instance of the content data at the destination path in the cloud database; and display, based on the reporting data, a progress indicator GUI that graphically indicates the progress of the file copy operation.

Example Clause F, the client device of any of Example Clauses A through E, wherein the computer-readable instructions further cause the client device to: display, during the file copy operation, a GUI that enables the user to generate second selection data that indicates a cancellation of the copy instruction; and generate, based on the second selection data, a cancellation instruction that causes the placeholder to be removed from the electronic folder structure at the local drive, and wherein the synchronization engine communicates at least some aspects of the cancellation instruction to the file hosting platform to cause the file hosting platform to terminate the file copy operation.

Example Clause G, the client device of any of Example Clauses A through F, wherein the individual file is a hydrated file for which the content data is redundantly stored at both the local drive and the cloud database.

Example Clause H, the client device of any of Example Clauses A through G, wherein the synchronization engine is configured to cause, in response to the individual file being dehydrated at the client device, the content data to be copied at the cloud database without receiving an upload of the content data from the client device.

Example Clause I, the client device of any of Example Clauses A through H, wherein the copy instruction that indicates the source file ID blob includes an operation ID that is associated with the placeholder, and wherein the computer-readable instructions further cause the client device to: associate the destination file ID blob with the placeholder in response to the operation ID being included within the response that indicates the destination file ID blob.

Example Clause J, a computer-implemented method comprising: determining a local electronic folder structure that includes at least a set of dehydrated files associated with content data that is absent from a local drive of a client device; receiving, at a client device, selection data indicating an individual dehydrated file, of the set of dehydrated files, to copy to a destination path within the local electronic folder structure; generating, based on the selection data, a dehydrated file copy of the individual dehydrated file at the destination path within the local electronic folder structure at the client device; and causing, based on the selection data, a file hosting platform to initiate a file copy operation within a cloud database, the file copy operation including: identifying, within the cloud database, an individual hydrated file that is a hydrated counterpart to the individual dehydrated file of the local electronic folder structure; and copying a portion of the content data that corresponds to the individual hydrated file to generate, within the cloud database, a hydrated file copy to serve a hydrated counterpart to the dehydrated file copy.

Example Clause K, the computer-implemented method of Example Clause J, further comprising: providing a source file ID blob, that is stored in association with the individual dehydrated file at the local electronic folder structure, to the file hosting platform to facilitate identifying the hydrated counterpart within the file hosting platform.

Example Clause L, the computer-implemented method of Example Clause K, further comprising: receiving, from the file hosting platform, a destination file ID blob that facilitates identification of the hydrated file copy in the cloud database; and storing, at the local drive, the destination file ID blob in the local electronic folder in association with the dehydrated file copy to define a correlation between the dehydrated file copy at the client device and the hydrated file copy at the cloud database.

Example Clause M, the computer-implemented method of any of Example Clauses J through L, wherein the generating the dehydrated file copy at the destination path within the local electronic folder structure includes copying, at the client device and based on the selection data, at least some metadata of the individual dehydrated file to the destination path within the local electronic folder structure.

Example Clause N, the computer-implemented method of any of Example Clauses J through M, wherein the local electronic folder structure is an at least partially dehydrated parent directory that is designated for synchronization with the cloud database to maintain a hydrated counterpart to the at least partially dehydrated parent directory such that local copy operations of dehydrated files trigger the file hosting platform to initiate cloud copy operations of corresponding hydrated files.

Example Clause O, the computer-implemented method of any of Example Clauses J through N, wherein the selection data that causes the file hosting platform to initiate the file copy operation within the cloud data layer is generated based on at least one of a drag-and-drop command or a copy-and-paste command performed by the user via a file-browser graphical user interface (GUI).

Example Clause P, a client device comprising: a local drive; one or more processors; a memory in communication with the one or more processors, the memory having computer-readable instructions stored thereupon which, when executed by the one or more processors, cause the client device to: determine a local directory structure that includes a set of dehydrated files associated with first content data that is absent from the local drive and a set of hydrated files associated with second content data that is stored on the local drive; receive selection data that indicates an individual file from the local directory structure, and a destination path within the local directory structure to generate a file copy of the individual file; determine a hydration status of the individual file to dynamically adjust a file copy operation for copying the individual file at a file hosting platform, wherein the hydration status indicates whether content data of the individual file is stored in the local drive of the client device; and based on the hydration status indicating that the individual file is dehydrated at the local drive, transmit at least a source file ID blob to the file hosting platform to cause the file hosting platform to: identify a first hydrated counterpart, to the individual file, that is stored in a cloud database; and generate, in the cloud database, a second hydrated counterpart to the file copy by copying the first hydrated counterpart.

Example Clause Q, the client device of Example Clause P, wherein the computer-readable instructions further cause the client device to: receive second selection data that indicates a second individual file from the local directory structure, and a second destination path within the local directory structure to generate a second file copy of the second individual file; and based at least in part on a determination that the second individual file is hydrated at the local drive, upload second content data of the second individual file from the local drive to the file hosting platform.

Example Clause R, the client device of Example Clause Q, wherein uploading the second content data from the local drive to the file hosting platform is further based on the second individual file being synchronized with a corresponding counterpart file that exists on the cloud database.

Example Clause S, the client device of any of Example Clauses P through R, wherein the computer-readable instructions further cause the client device to receive, from the file hosting platform, a destination file ID blob that facilitates identification of the second hydrated counterpart in the cloud database.

Example Clause T, the client device of Example Clause S, wherein the computer-readable instructions further cause the client device to associate the destination file ID blob with the file copy in the local drive.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A client device for remotely initiating file copy operations that are contained within a cloud data layer, the client device comprising:
a local drive;
one or more processors;
a memory in communication with the one or more processors, the memory having computer-readable instructions stored thereupon which, when executed by the one or more processors, cause the client device to:
determine a local electronic folder structure for providing access to one or more files that are stored within the local drive at the client device;
display a file-browser graphical user interface (GUI) showing the one or more files arranged within the local electronic folder structure, wherein the file-browser GUI enables a user to generate selection data indicating an individual file, of the one or more files, and a destination path within the local electronic folder structure to copy the individual file to;
generate, in response to the selection data, a copy instruction that indicates at least the destination path and a source file ID blob corresponding to the individual file;
transmit the copy instruction to a synchronization engine to cause the synchronization engine to communicate one or more aspects of the copy instruction to a file hosting platform storing content data of the individual file, wherein the one or more aspects, of the copy instruction that is generated in response to the selection data generated via the file-browser GUI showing the one or more files arranged within the local electronic folder structure, cause the file hosting platform to initiate a file copy operation to generate a file copy by copying a first instance of the content data from a source path in a cloud database to generate a second instance of the content data in the cloud database in association with the destination path;
receive, from the file hosting platform, a response that indicates at least a destination file ID blob corresponding to the file copy in the cloud database that is associated with the destination path; and
update, based on the response received from the file hosting platform, the local electronic folder structure at the local drive to include a placeholder for providing access to the file copy at the client device, wherein the placeholder is stored within the local drive and indicates at least the destination file ID blob provided by the file hosting platform.

2. The client device of claim 1, wherein the computer-readable instructions further cause the client device to:
determine a hydration status, of the individual file, that indicates whether the content data of the individual file is stored in the local drive; and
determine the one or more aspects of the copy instruction based at least in part on the hydration status.

3. The client device of claim 2, wherein the computer-readable instructions further cause the client device to include the source file ID blob within the copy instruction based at least in part on the hydration status indicating that the individual file is a dehydrated file such that the content data is absent from the local drive.

4. The client device of claim 1, wherein the file-browser GUI is generated in accordance with a user application that enables the user to copy dehydrated files, that are stored within the local electronic folder structure at the local drive, to remotely initiate the file copy operations for copying hydrated files, that correspond to the dehydrated files, within the local electronic folder structure at the cloud database.

5. The client device of claim 1, wherein the computer-readable instructions further cause the client device to:
receive reporting data that indicates at least progress of the file copy operation associated with an amount of the first instance of the content data that has been copied from the source path in the cloud database to the second instance of the content data at the destination path in the cloud database; and
display, based on the reporting data, a progress indicator GUI that graphically indicates the progress of the file copy operation.

6. The client device of claim 1, wherein the computer-readable instructions further cause the client device to:
display, during the file copy operation, a GUI that enables the user to generate second selection data that indicates a cancellation of the copy instruction; and
generate, based on the second selection data, a cancellation instruction that causes the placeholder to be removed from the local electronic folder structure at the local drive, and wherein the synchronization engine communicates one or more aspects of the cancellation instruction to the file hosting platform to cause the file hosting platform to terminate the file copy operation.

7. The client device of claim 1, wherein the individual file is a hydrated file for which the content data is redundantly stored at both the local drive and the cloud database.

8. The client device of claim 1, wherein the synchronization engine is configured to cause, in response to the individual file being dehydrated at the client device, the content data to be copied at the cloud database without receiving an upload of the content data from the client device.

9. The client device of claim 1, wherein the copy instruction that indicates the source file ID blob includes an operation ID that is associated with the placeholder, and wherein the computer-readable instructions further cause the client device to:
associate the destination file ID blob with the placeholder in response to the operation ID being included within the response that indicates the destination file ID blob.

10. The client device of claim 1, wherein the one or more aspects of the copy instruction include at least the source file ID blob corresponding to the individual file at the destination path.

11. A computer-implemented method comprising:
determining a local electronic folder structure that includes at least a set of dehydrated files associated with content data that is absent from a local drive of a client device;
receiving, at a client device, selection data indicating an individual dehydrated file, of the set of dehydrated files, to copy to a destination path within the local electronic folder structure;
generating, based on the selection data, a dehydrated file copy of the individual dehydrated file at the destination path within the local electronic folder structure at the client device;
causing, based on the selection data, a file hosting platform to initiate a file copy operation within a cloud database, the file copy operation including:
identifying, within the cloud database, an individual hydrated file that is a hydrated counterpart to the individual dehydrated file of the local electronic folder structure; and copying a portion of the content data that corresponds to the individual hydrated file to generate, within the cloud database, a hydrated file copy to serve a hydrated counterpart to the dehydrated file copy;

receiving, from the file hosting platform, a destination file ID blob corresponding to the hydrated file copy in the cloud database; and updating the local electronic folder structure at the local drive to indicate the destination file ID blob provided by the file hosting platform.

12. The computer-implemented method of claim 11, further comprising:

providing a source file ID blob, that is stored in association with the individual dehydrated file at the local electronic folder structure, to the file hosting platform to facilitate identifying the hydrated counterpart within the file hosting platform.

13. The computer-implemented method of claim 12, further comprising:

storing, at the local drive, the destination file ID blob in the local electronic folder in association with the dehydrated file copy to define a correlation between the dehydrated file copy at the client device and the hydrated file copy at the cloud database.

14. The computer-implemented method of claim 11, wherein the local electronic folder structure is an at least partially dehydrated parent directory that is designated for synchronization with the cloud database to maintain a hydrated counterpart to the at least partially dehydrated parent directory such that local copy operations of dehydrated files trigger the file hosting platform to initiate cloud copy operations of corresponding hydrated files.

15. The computer-implemented method of claim 11, wherein the selection data that causes the file hosting platform to initiate the file copy operation within the cloud data layer is generated based on at least one of a drag-and-drop command or a copy-and-paste command performed by the user via a file-browser graphical user interface (GUI).

16. A client device comprising:

a local drive;

one or more processors;

a memory in communication with the one or more processors, the memory having computer-readable instructions stored thereupon which, when executed by the one or more processors, cause the client device to:

determine a local directory structure that includes a set of dehydrated files associated with first content data that is absent from the local drive and a set of hydrated files associated with second content data that is stored on the local drive;

receive selection data that indicates an individual file from the local directory structure, and a destination path within the local directory structure to generate a file copy of the individual file;

determine a hydration status of the individual file to dynamically adjust a file copy operation for copying the individual file at a file hosting platform, wherein the hydration status indicates whether content data of the individual file is stored in the local drive of the client device; and based on the hydration status indicating that the individual file is dehydrated at the local drive:

generate the file copy within the local directory structure, cause the file hosting platform to copy at least a portion of a first hydrated counterpart, to the individual file, that is stored in a cloud database to generate, in the cloud database, a second hydrated counterpart to the file copy, receive, from the file hosting platform, a destination file ID blob corresponding to the second hydrated counterpart in the cloud database; and update the local directory structure at the local drive to indicate the destination file ID blob provided by the file hosting platform.

17. The client device of claim 16, wherein the computer-readable instructions further cause the client device to:

receive second selection data that indicates a second individual file from the local directory structure, and a second destination path within the local directory structure to generate a second file copy of the second individual file; and based at least in part on a determination that the second individual file is hydrated at the local drive, upload second content data of the second individual file from the local drive to the file hosting platform.

18. The client device of claim 17, wherein uploading the second content data from the local drive to the file hosting platform is further based on the second individual file being synchronized with a corresponding counterpart file that exists on the cloud database.

19. The client device of claim 16, wherein the computer-readable instructions further cause the client device to receive, from the file hosting platform, a destination file ID blob that facilitates identification of the second hydrated counterpart in the cloud database.

20. The client device of claim 19, wherein the computer-readable instructions further cause the client device to associate the destination file ID blob with the file copy in the local drive.

* * * * *